United States Patent [19]
Clark

[11] 3,736,970
[45] June 5, 1973

[54] TIRE TRACTION DEVICE

[76] Inventor: John R. Clark, East 13717 Heroy Avenue, Spokane, Wash.

[22] Filed: Aug. 12, 1971

[21] Appl. No.: 171,062

[52] U.S. Cl. ............................................. 152/226
[51] Int. Cl. ............................................. B60c 27/04
[58] Field of Search............................... 152/226, 225

[56] References Cited

UNITED STATES PATENTS

| | | | |
|---|---|---|---|
| 2,806,503 | 9/1957 | Hamerski | 152/225 |
| 3,019,830 | 2/1962 | Shelby | 152/225 |
| 3,249,143 | 5/1966 | Scott | 152/225 |
| 3,079,972 | 3/1963 | Formon | 152/225 |
| 1,287,512 | 12/1918 | Swanson | 152/225 |

*Primary Examiner*—James B. Marbert
*Attorney*—Keith S. Bergman

[57] ABSTRACT

A tire traction device, that can be placed from one side upon a tire resting on a supporting surface, providing a central, flexible, fastening band carrying plural radial extending traction arms to fit about the outer side and periphery of a tire with medial, releasably positioned spacing means communicating between adjacent traction arms. The peripheral portion of the traction arms adjust to accomodate to tires of varying widths and the inner fastening band adjusts to accomodate to tires of varying diameters. The traction arms are movably biased to accommodate to change in tire shape upon motion and the traction elements, per se, are releasably held for simple replacement.

5 Claims, 10 Drawing Figures

Patented June 5, 1973 3,736,970

JOHN R. CLARK, INVENTOR.

BY

Patented June 5, 1973 3,736,970
3 Sheets-Sheet 2
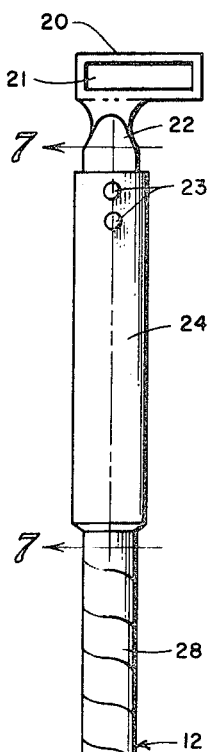
FIGURE 3
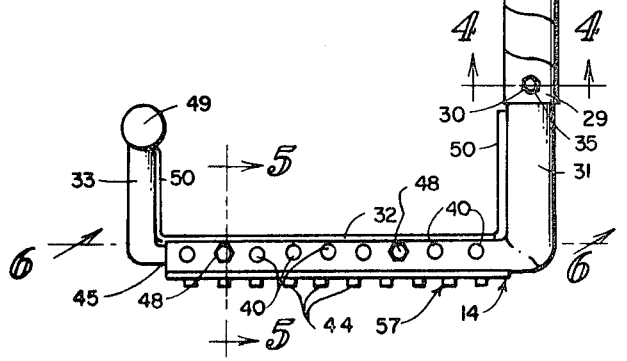
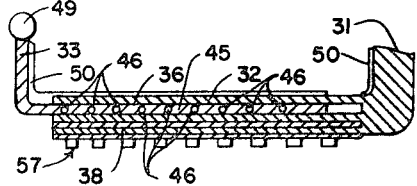
FIGURE 5
FIGURE 4
FIGURE 6
JOHN R. CLARK, INVENTOR.
BY Patented June 5, 1973
3,736,970
3 Sheets-Sheet 3
FIGURE 7
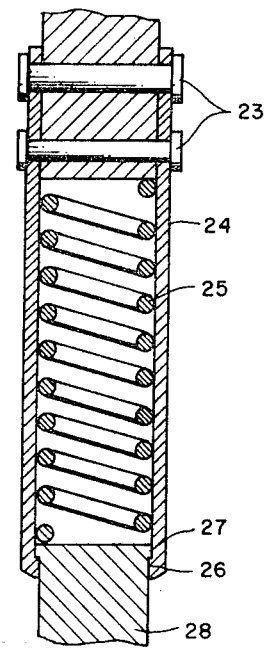
FIGURE 8
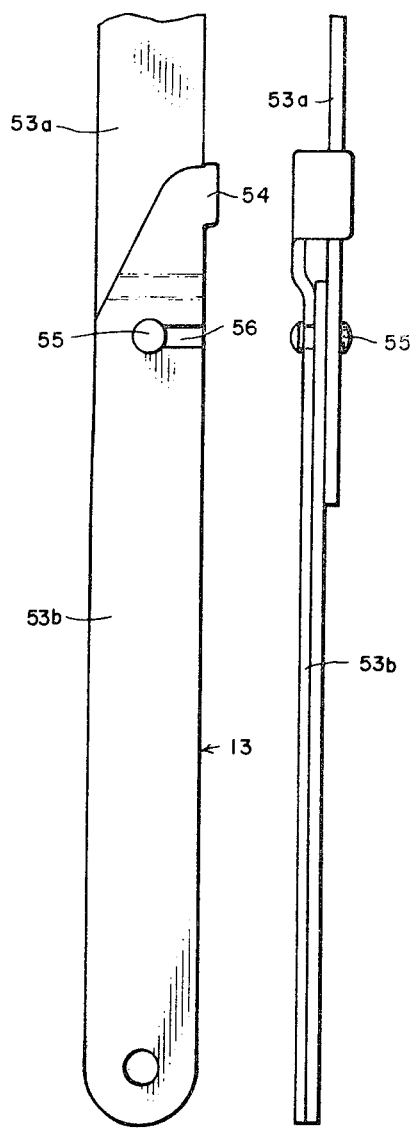
FIGURE 10
FIGURE 9
JOHN R. CLARK, INVENTOR.
BY 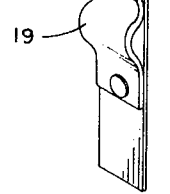

TIRE TRACTION DEVICE

BACKGROUND OF INVENTION

RELATED APPLICATIONS

There are no applications related hereto now filed in this or any foreign country.

FIELD OF INVENTION

This invention relates generally to traction devices for pneumatic-tires and more particularly to such a device that may be placed from one side upon a vehicle tire supported by an underlying surface.

DESCRIPTION OF PRIOR ART

Auxiliary devices to increase the traction of pneumatic vehicular tires have heretofore been found desirable, and in some instances necessary. In response many such devices have become known, principal among which is the common tire chain. Circumferential devices such as the tire chain are difficult to position, requiring for installation that the vehicle be moved in one fashion or another, either upwardly or lineally, to complete the installation since the chains pass completely about the tire periphery and one part of the periphery is supported with some force against an underlying supportive surface. The problem is often enhanced by the required installation of traction devices under adverse environmental conditions.

In response to this problem there have come to be known various auxiliary traction devices that may be placed on or about a pneumatic-tire by manipulations not requiring the movement of the tire upon or above its supporting surface. One class of such devices provides support structure releasably positionable adjacent the outer surface of a pneumatic-tire with plural traction bars communicating perpendicularly over and about the peripheral tire surface or tread. The instant invention seeks to provide a new and improved member of this class.

In distinguishment from the prior art: the instant invention provides an adjustable, flexible tightening band to fasten radially extending traction arms about a tire, thus providing a simpler fastening means than prior art devices and one that allows use of the same device on tires of varying diameters. The instant device provides an adjustable traction arm to accommodate to tires of varying width or thicknesses, whereas prior art devices either do not accommodate to tires of differing widths or would not fasten securely and properly thereabout. The instant device further provides a releasably held traction element that allows replacement upon damage or deterioration, whereas prior art devices generally provided a fixedly positioned traction element. The instant invention futher provides a U-shaped traction arm with a spherical end and resilient, tire-contacting surface that provides simple yet reliable fastening upon the pneumatic tire. The instant invention thusly differs in structure from various known elements of the prior art either individually or in combination.

SUMMARY OF INVENTION

My invention provides an inner flexible fastening band, having releasably and adjustably joinable ends with plural, elongate, traction arms carried thereby at spaced distances therealong to extend radially outwardly therefrom. Each traction arm provides a compound elongate body carrying a perpendicular U-shaped endmost traction arm to extend over and about the peripheral tread surface of a pneumatic-tire. The body of the traction arm is biasedly movable parallel to its length to maintain the traction bars firmly about a tire body but yet movable radially therewith during motion caused deformation.

The inner end part of the traction bar mounts a resilient knob to aid application of the device to a tire and protect the tire. The traction bar itself is of compound structure to provide for adjustment of width. It mounts on its radially outer surface the releasably positionable traction element and on its inner surface a resilient element to protect the supporting tire.

A medial, annular band of compound spacers communicates between adjacent traction arms to aid in maintaining the arms in radially spaced position during placement and operation. At least one of these arms is releasably fastenable to allow the traction device to be folded to occupy a small space when not in use.

In providing such a tire traction device it is:

A principal object of my invention to create a pneumatic-tire traction device that may be placed upon a vehicle tire without moving the tire relative to its supporting surface and will accommodate to nicely fit upon tires of various configurations and sizes.

A further object of my invention to create such a device with a medial, flexible, band-type body that is releasably and adjustably joinable at its ends to allow simple placement as well as adjustment for tires of varying diametrical size.

A further object of my invention to provide a traction arm having an adjustable traction bar to accommodate to tires of varying width and yet be maintained in a nice fit thereupon.

A still futher object of my invention to provide a traction bar having a releasably carried traction element that can be replaced.

A still further object of my invention to provide a device of the nature aforesaid that is so configured and provided with appropriate mechanical linkages to allow it to be folded to occupy a relatively small volume when not in use, but yet be simply assembliable for use.

A still further object of my invention to provide such a tire traction device that is of simple and economic manufacture, of rugged and durable nature, of new and novel design and otherwise well adapted to the uses and purposes for which it is intended.

Other and further objects of my invention will appear from the following specification and accompanying drawings which form a part hereof. In carrying out the objects of my invention, however, it is to be understood that its essential features are susceptible of change in design and structural arrangement with only one preferred and practical embodiment being illustrated in the accompanying drawings as required.

BRIEF DESCRIPTION OF DRAWINGS

In the accompanying drawings which form a part of this specification and wherein like numbers of reference refer to similar parts throughout:

FIG. 3 is an orthographic side-view of one of the traction arms of my invention, showing its various parts, their configuration and relationship.

FIG. 4 is a cross-sectional view of the traction arm of FIG. 3, taken on the line 4—4 in the direction indicated by the arrows.

FIG. 5 is a transverse cross-sectional view through the traction bar of the traction arm of FIG. 3, taken on the line 5—5 in the direction indicated by the arrows.

FIG. 6 is an elongate cross-sectional view through the traction portion of the traction arm of FIG. 3, taken on the line 6—6 thereon in the direction indicated by the arrows.

FIG. 7 is a somewhat enlarged, partial, vertical cross-sectional view through the spring-biased portion of the traction arm of FIG. 3, taken on the line 7—7 in the direction indicated by the arrows.

FIG. 8 is a partial front orthographic view of the openable medial spacer member communicating between adjacent traction arms.

FIG. 9 is an orthographic side-view of the spacer arm illustrated in FIG. 8.

FIG. 10 is an isometric view of the flexible tightening band of my invention.

DESCRIPTION OF THE PREFERRED EMBODIMENT

Figure 1:
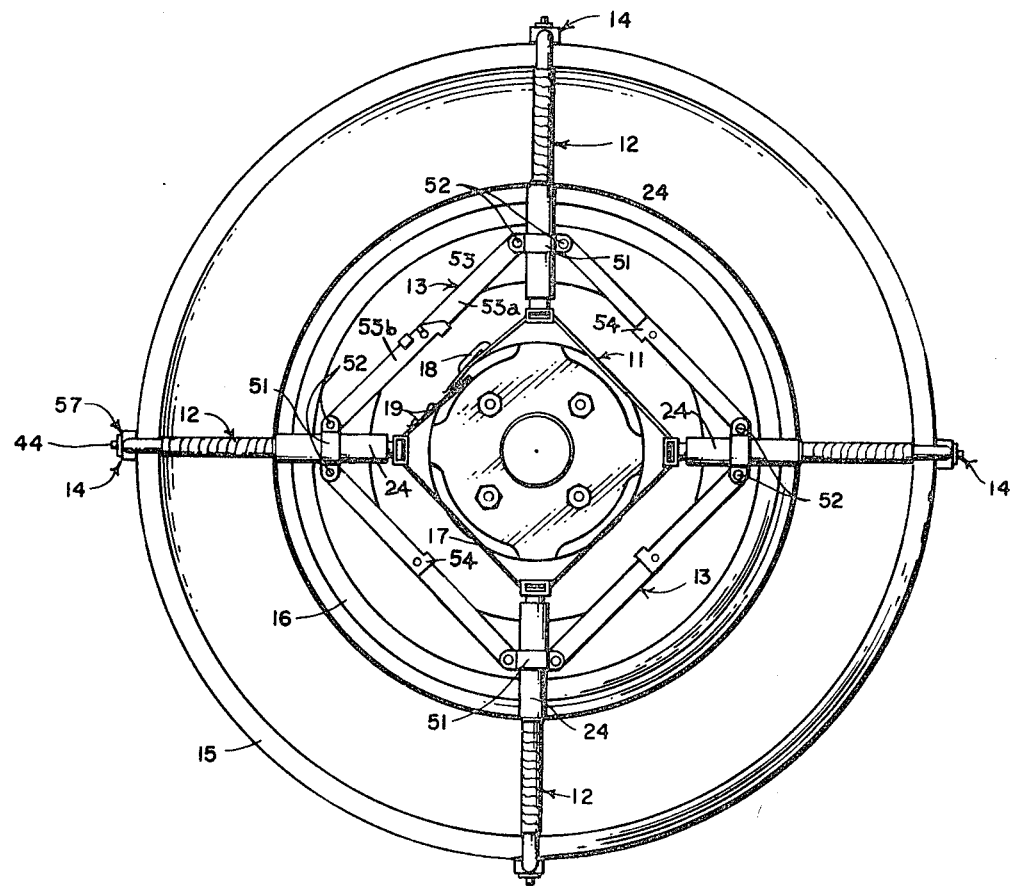
FIG. 1 is an orthographic side-view of a four-arm version of my invention in operative position upon a pneumatic-tire.
Figure 2:
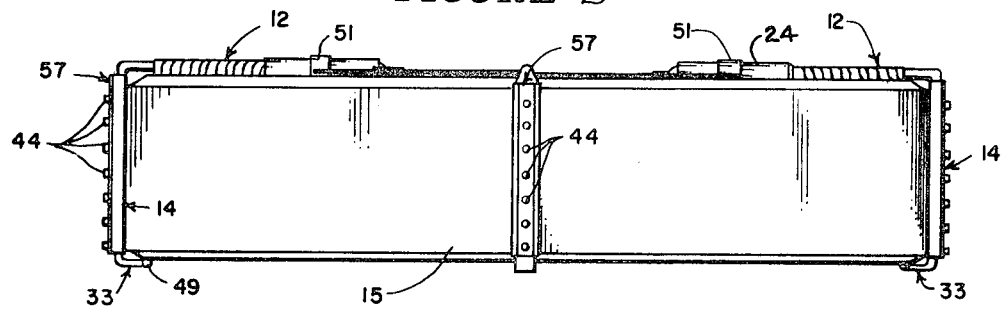
FIG. 2 is an orthographic top view of the device of FIG. 1.
Figure 2:

Referring now to the drawings in more detail and particularly to those of FIGS. 1 and 2, it will there be seen that my invention generally comprises inner fastening member 11 carrying plural radially extending traction arms 12 maintained in radial position by spacing elements 13 so that traction bars 14 are in spaced position about the peripheral tread of pneumatic-tire 15 carried upon wheel 16.

Fastening member 11, illustrated particularly in FIG. 6, is an elongate band-like element 17 having pivotable catch lever 18 at one end to fasten that end to one of plural spaced catch members 19 carried by the other end. Band member 17 is of some flexible material such as steel to provide the substantial tensile strength required in the tightening operation. The particular form of fastener 18, 19 by which the ends are releasably joined in adjustable relationship is not critical to my invention and undoubtedly other types of known fasteners would serve its purposes, but the one illustrated has been found simple and reliable in operation.

Traction arms 12 are illustrated particularly in FIGS. 3, 4, 5 and 6. The innermost portion of the traction arm provides elongate fastening bracket 20 defining fastening member channel 21 to accept the fastening member and maintain the traction arm thereon. The fastening bracket communicates structurally with inner arm body 22 which a short distance outwardly, radially speaking, from the fastening bracket mechanically joins, in this instance by rivets 23, hollow, cylindrical spring sleeve 24 carrying compression spring 25 in its internal chamber. The radially outward end of spring sleeve 24 has internal annular ridge 26 to cooperate with external boss 27 of outer arm body 28 to maintain that element within the channel of spring sleeve 24. Elongate outer arm body 28 defines medial channel 29 in its outer end part to accept end 31 of the traction bar 14 and allow its maintenance in mechanical pinder, in this instance by rivet 35 extending through hole 30 therein.

U-shaped traction bar 14 is formed by inner arm 31, medial body 32 and outer arm 33. The inner arm defines hole 34 receiving rivet 35 to in cooperation with hole 30 of the traction arm mechanically join the elements. Medial body part 32 defines rectilinear outer arm body channel 36 communicating by elongate tire protector slot 37 through the radially inwardly facing surface of the body to slideably receive the outer arm body. Inwardly adjacent the radially outwardly facing surface, medial body part 32 defines rectilinear traction element channel 38 communicating by elongate slot 39 to the radially outer surface of the body member to receive slideably the traction element. Plural, spaced, laterally extending holes 40 are provided through medial body 32 to communicate with outer arm body channel 36 to accept bolts to aid releasable positioning of the outer arm body in the channel.

Traction element 57 is of the H-shape cross-sectional configuration illustrated in FIG. 5, with inner arm 41 adapted to fit within traction element channel 38, body portion 42 to fit within slot 39, and outer portion 43 to fit with its radially inward surface immediately outwardly adjacent the radially outward surface of the traction bar. Traction element inner arm 41 and traction element channel 38 are so sized as to provide a press-type fit to maintain the elements in frictional communication during use, but allow their relative motion for replacement or repair by mechanical means such as hammer caused impact. The radially outwardly facing surface of outer portion 43 of the traction element structurally carries plural, spaced, traction protuberances 44 formed of some durable material such as a metallic carbide to provide a long wearing surface of relatively great tractional potentality.

Outer arm 33 provides perpendicularly extending outer arm body 45, configured to slideably fit within outer arm body channel 36. Plural spaced holes 46 are provided in the body 45 to cooperate with holes 40 defined in the medial body part of the traction bar to accept nut-bolt combinations 48 therebetween to releasably maintain the outer arm in adjustable position relative the traction bar body. The radially inwardly projecting end of outer arm 33 carries spheroidal protuberances 49 formed of some resilient material such as rubber to prevent mechanical puncture or damage to supporting tires during operation. The inward, tire-facing surfaces of outer arm 33 and outer arm body 45 structurally carry some resilient tire protecting material 50, such as rubber, to communicate directly with the tire surface in a fashion to avoid contact damage thereto. The tire protecting elements 49, 50 may be formed of any resilient, semi-pliable, durable material, but rubber is preferred.

Spacing members 13 provide brackets 51 carried by each traction arm 12, about spring sleeve 24, each bracket having outwardly extending ears pivotably communicating by pins 52 with compound spacer arms 53 extending therebetween. The spacer arm elements are pivotably joined in their medial parts by pins 47 and prevented from outward pivotable motion past a straight line by outward fastening elements 54. One spacer arm provides releasably joinable parts 53a and 53b, the latter carrying overturned fastening element 54 to catch on the opposed cooperating arm to create a rigid, releasably joinable, linear support. Arm 53a carries pin 55 adapted to fit within slot 56 of arm 53b to aid the fastening and allow the arms to be pivotably moved relative each other in an inward direction, but not outwardly past a straight line when in assembled condition.

Commonly the various elements of my invention will be made from metal of appropriate characteristics to provide the required strength and durability except for the tire protecting elements 49, 50 which normally will be formed of rubber or similar soft resilient material as stated. All elements will be appropriately sized, as illustrated in FIGS. 1 and 2, within appropriate limits, to allow placement on a particular tire to be served.

Having thusly described the structure of my invention, its use may now be understood.

A traction device is assembled as specified and illustrated in FIG. 1, with a plurality of traction arms 12 positioned upon fastening member 11 and extending radially outwardly therefrom at substantially equally spaced radial positions. The number of traction arms is not essential to my invention and can vary, though in normal usage four such arms, as illustrated, are sufficent. Spacing members 13 are appropriately adjusted or positioned to radially space the outwardly extending traction arms.

The whole device then, with fastening member 11 loose, is placed immediately adjacent the outer vertical face of pneumatic-tire 15 operatively carried upon ordinary wheel 16, with the traction arms positioned so that traction bars 14 will communicate about the peripheral tread of the tire at points other than at its area of support. In this condition, spacing members 53a, 53b are fastened as illustrated in FIG. 1 to maintain the spaced radial position of traction arms 12. The traction bars then are positioned about the periphery of the tire by appropriate manual manipulation upon the loosened fastening member 11. In this regard it is to be noted that when the fastening member be loosened one or more traction arms may be moved some distance radially outwardly from the center of tire 15 and it is also to be noted that outer arm body 28 is free to pivot, or in fact rotate, relative spring sleeve 24 and inner body 22, thus allowing traction bar 14 to pivot or rotate relative these inner members to aid in positioning the device. It is thusly possible, and in fact quite convenient, to place the device on a tire from its outside surface without raising the tire off the underlying supporting surface or moving it lineally.

With the traction device placed in this fashion, fastening member 11 is then positioned with pivotable fastening lever 18 in an appropriate catch element 19, and the lever then manually operated to tightly fasten the ends of member 11, thusly moving all traction arms 12 radially inwardly so that the traction bars 14 are firmly positioned about the periphery of pneumatic-tire 15. The device is then in operative position.

As the tire moves in a radial fashion, the downward or supported part of the tire wall will move radially inwardly some distance by reason of its elasticity. As it does so, outer arm 28 of the traction arm will move radially inward against the bias of spring 25, but when the tire again moves outwardly to its normal position, this arm will return with the tire periphery, always to be maintained firmly thereagainst.

It is to be noted from the foregoing description that the various adjustable elements of my invention allow a single, assembled traction device to be used upon variously sized tires. Outer arm 33 of traction bar 14 may be adjusted relative medial body part 32 to accommodate tires of varying tread width or thicknesses. Medial fastening member 11 may be adjusted by fastening lever portion 18 in any one of plural spaced catch elements 19 to adjust the device to tires of varying diameters. Brackets 51 may also be moved upon spring sleeves 24 to accommodate to circumferential adjustments if required.

It is further to be noted that traction elements 40 of my invention are releasably positioned and if necessary may be removed for repair or replacement. Since they are the only wearable or substantially deteriorable element of my invention, it has an almost unlimited life with appropriate replacement of traction elements.

It is further to be noted from the structure of my invention that notwithstanding the position of the device during tire motion, it will constantly remain firmly supported about a particular tire without the whole or any of its parts being free to move relative to the tire.

The foregoing description of my invention is necessarily of a detailed nature so that a specific embodiment of it may be set forth as required, but it is to be understood that various modifications of detail, rearrangement and multiplication of parts may be resorted to without departing from its spirit, essence or scope.

Having thusly described my invention, what I desire to protect by Letters Patent, and

What I claim is:

1. A device, to aid the traction of a pneumatic-tire, that may be placed from the side of a tire operatively positioned on a vehicle without moving the tire relative to its supporting surface, comprising, in combination:
   an elongate, flexible, band-like fastening member having means for adjustably and releasably fastening its ends together;
   elongate traction arms carried by the fastening member to extend radially outwardly therefrom, the body of each traction arm being compound to allow the outer part to move radially inward relative the inner part against a normally outward bias; and
   traction bars carried by the outer body part of each traction arm at the radially outer extension, the traction bars extending perpendicularly to the traction arms to communicate across the peripheral tread of a supporting tire.

2. The invention of claim 1 further characterized by:
   the traction bar having a channel inwardly adjacent and communciating to its radially outer surface to slideably receive and releasably maintain a traction element extending radially outward past the radially outer surface of the traction bar to provide a durable traction surface.

3. The invention of claim 1 further characterized by:
   the traction bar being compound with medial body having a channel to adjustably receive one leg of an L-shaped outer arm with the other perpendicular leg of the outer arm adapted to fit adjacent the inner side of a supporting tire; and
   mechanical fastening means communicating between the body and outer arm to releasably maintain the elements in adjustable position relative each other.

4. The invention of claim 1 further characterized by:
   the tire contacting surfaces of the traction bars carrying protective material to directly contact a supporting tire.

5. In a pneumatic-tire traction aiding device of the type having plural, radially extending traction arms carrying perpendicular traction bars to communicate across the peripheral tread of a tire, the invention comprising:
  an elongate, flexible, band-like, medial fastening member carrying the inner end portions of the traction arms; and
  releasable, adjustable fastening means carried by the cooperating end parts of the fastening band to allow the adjustable fastening of the end parts to each other to tighten the traction arms radially inwardly when in place upon a supporting tire to cause their fastening thereabout.

* * * * *